Patented Nov. 25, 1952

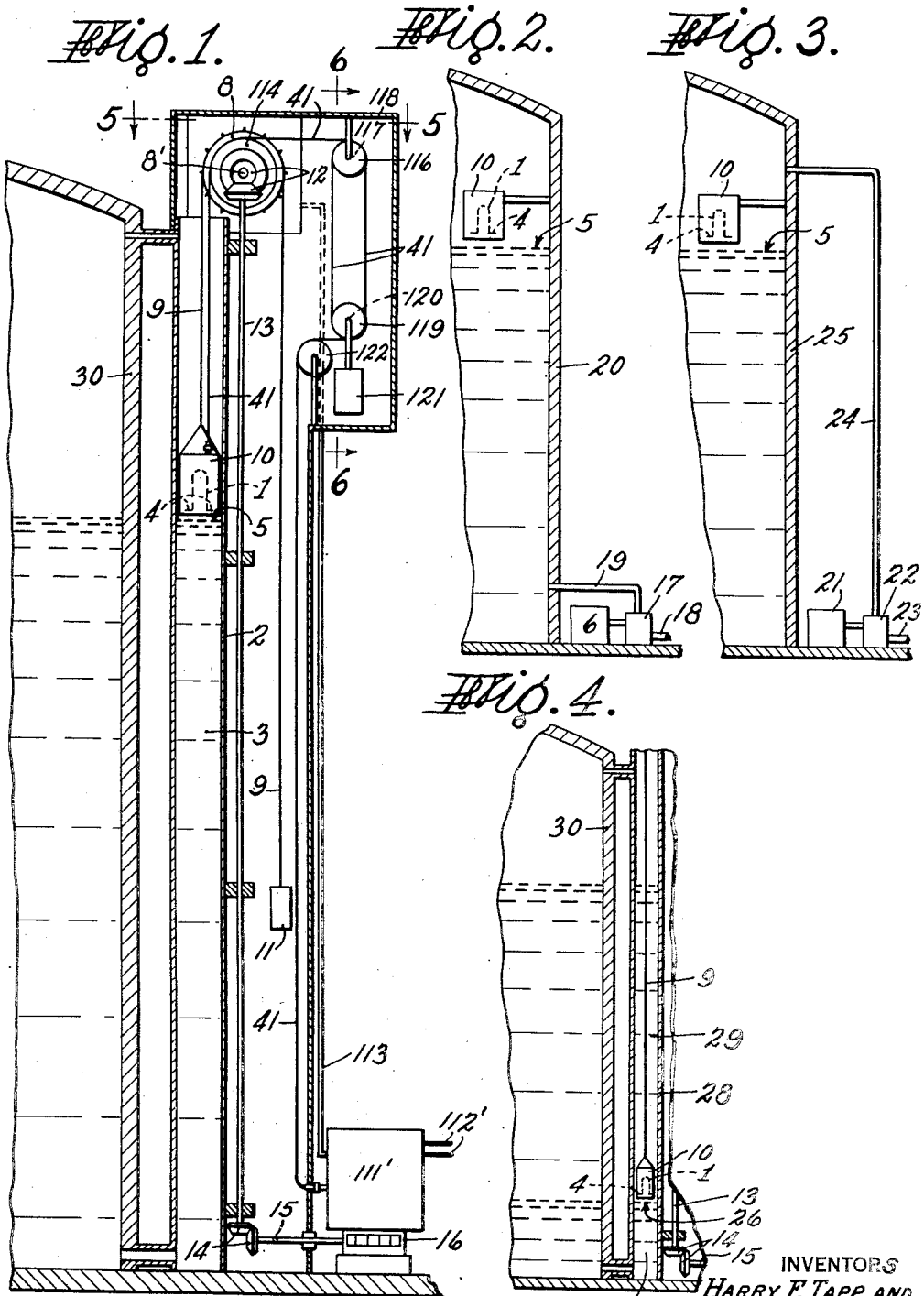

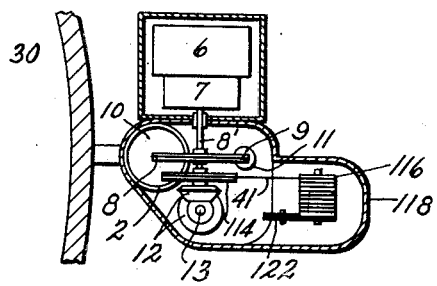
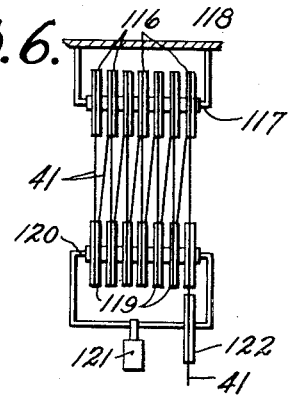
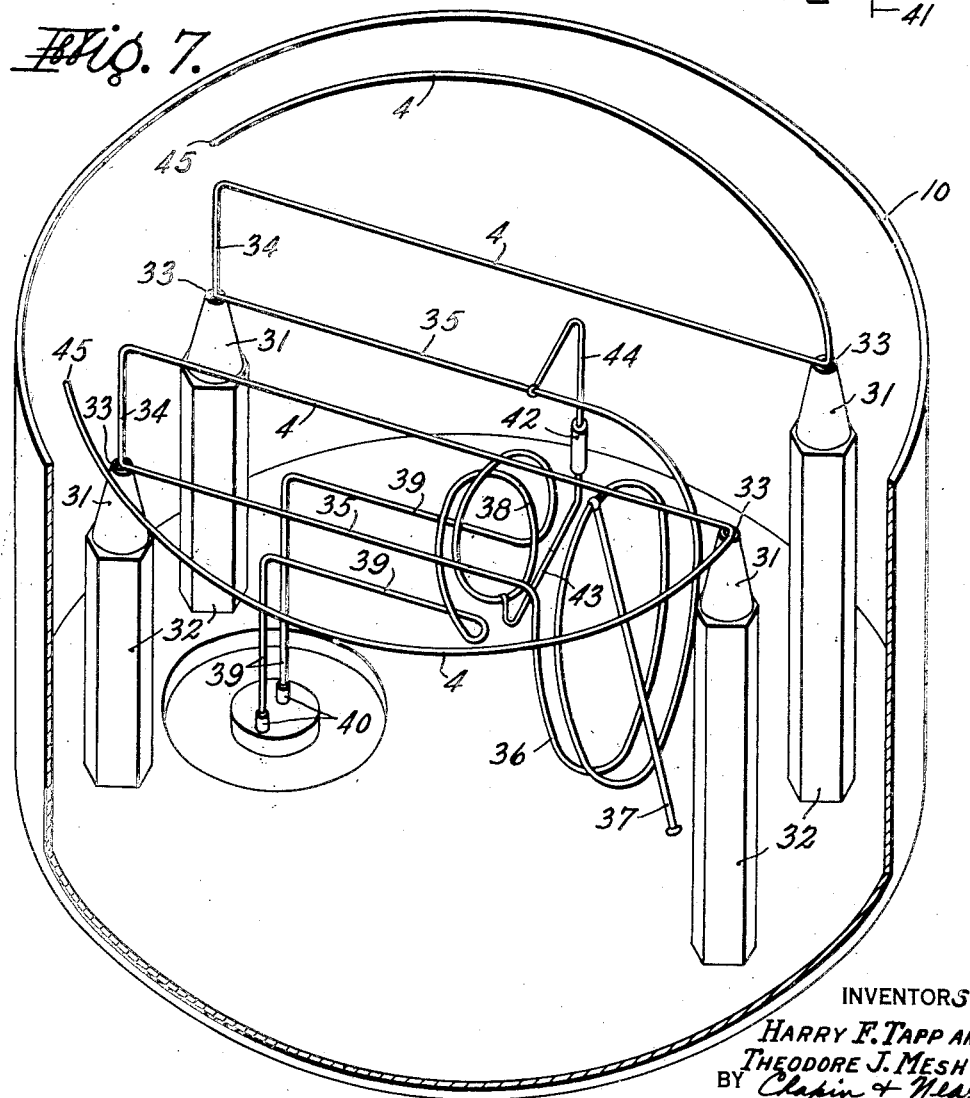

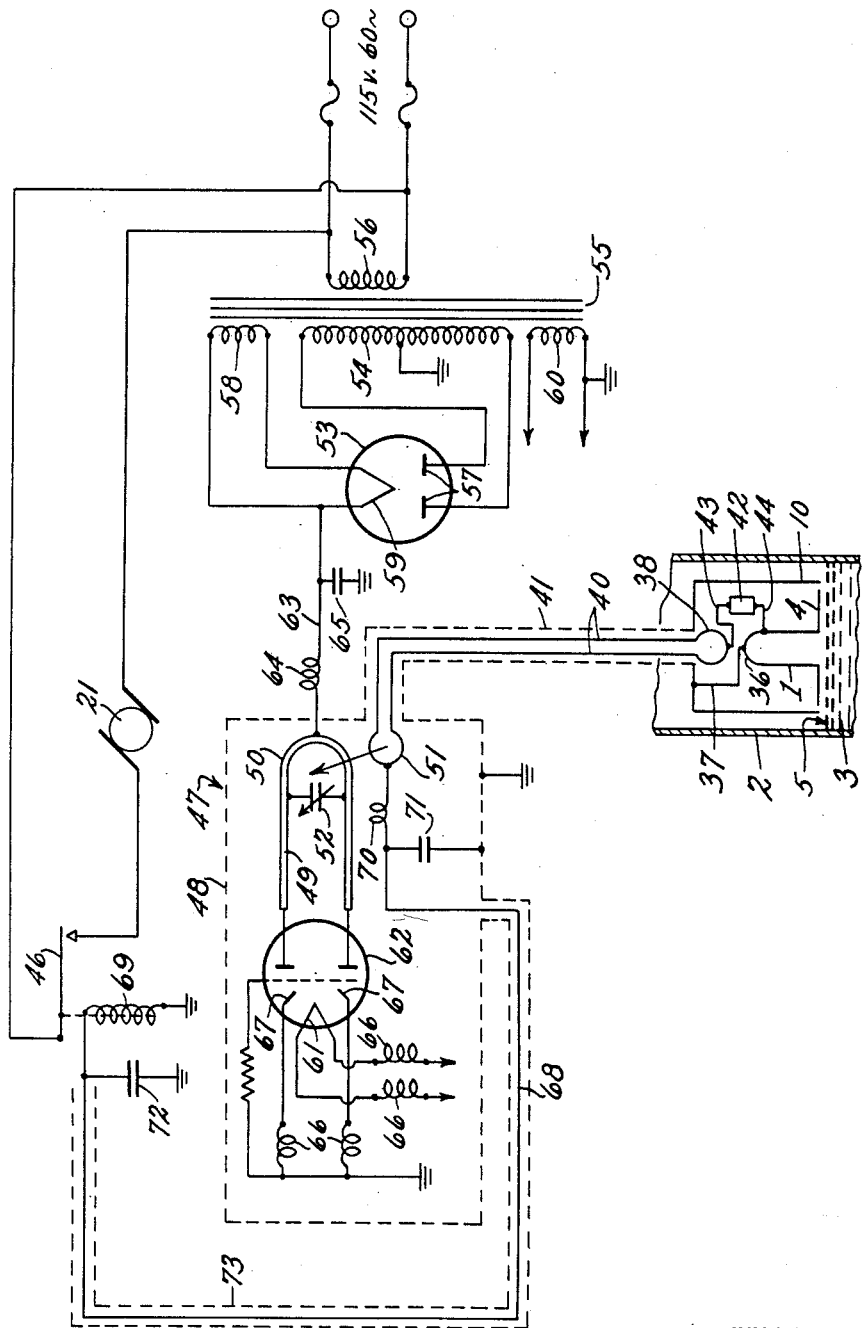

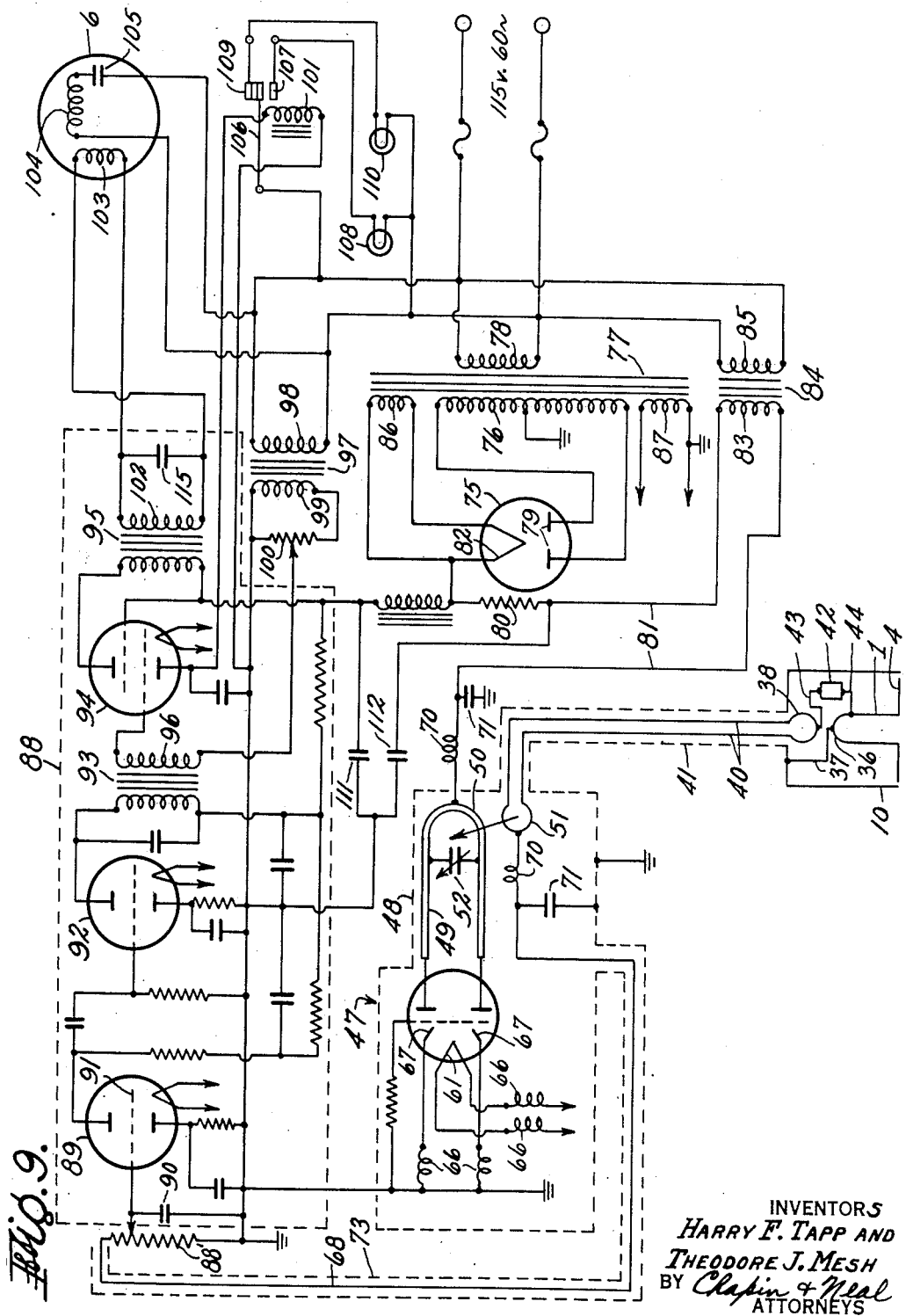

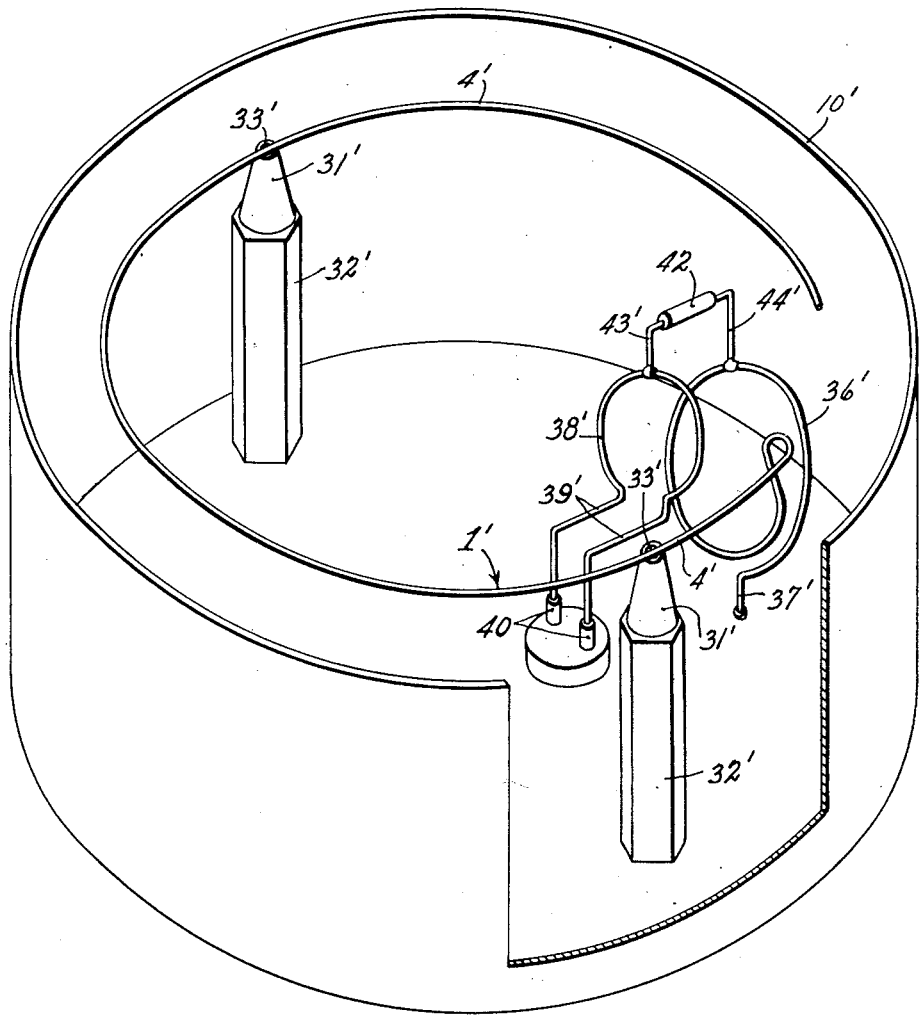

2,619,620

UNITED STATES PATENT OFFICE 2,619,620

ELECTRONIC LEVEL-SENSITIVE APPARATUS

Harry F. Tapp, Longmeadow, and Theodore J. Mesh, Easthampton, Mass., assignors to Gilbert & Barker Manufacturing Company, West Springfield, Mass., a corporation of Massachusetts Application November 28, 1950, Serial No. 197,964

13 Claims. (Cl. 318—31)

This invention relates to an improved electronic level-sensitive apparatus for use with containers of fluent material either for the purpose of indicating the level of the material in the container or for the purpose of maintaining the material at a predetermined level in the container.

The invention has for an object the provision in an apparatus of the class described of a level-sensitive element, which is spaced above the surface of the fluent material in the container and is automatically maintained in a predetermined spaced relationship with such surface, whereby the element may be maintained out of contact with the material so as not to be affected by the character of the material, such as corrosiveness or viscosity, nor by waves in the material.

The invention has for another object the provision of a level-sensitive element with electronic means, which maintain a predetermined spaced relationship between the element and the surface of the material in a container and which functions with such a small electric current inside the container that it may be safely used where the fluent material is inflammable.

Another object of the invention is to provide an exceedingly sensitive apparatus for determining the liquid level in a container with very close accuracy, say within a few hundredths of one per cent.

The invention has for another object the provision in apparatus of the class described of a level-sensitive element, comprising a wire element which is electrically resonant at a predetermined frequency and on which a high frequency signal is impressed, said element being detuned from resonance, when the wire and surface of the material are brought closer together, and means for effecting relative movement between said wire and surface, controlled by variation of a signal derived from said wire.

The invention has for a further object the provision of a non-hunting level-sensitive apparatus comprising a two-phase low-frequency alternating current electric motor for effecting relative movement between the level-sensitive resonant wire and the surface of the fluent material in the container, either by raising and lowering the wire itself or by raising and lowering the level of the fluent material, a high-frequency low-power oscillator inductively coupled to the resonant wire and tuned to resonance therewith, when the wire and fluent material are relatively widely separated, said oscillator being modulated with alternating current of the same low frequency as the motor and producing a signal in the resonant wire, and means for deriving from said signal a low frequency signal, which is amplified and transmitted to the motor to oppose the alternating current supply to various degrees, according to the spacing of said wire and level, and cause the motor to turn in one direction or the other as necessary to maintain the wire and level in said predetermined relationship and to stop when such relationship is attained.

These and other objects will more particularly appear from the following description of illustrative examples of the invention in the accompanying drawings, in which:

Figs. 1, 2, 3 and 4 are small-scale, fragmentary sectional elevational views illustrating various ways of mounting the level-sensitive element of the apparatus in a container of fluent material;

Figs. 5 and 6 are sectional views taken on the lines 5—5 and 6—6 of Fig. 1;

Fig. 7 is a perspective view, with parts broken away, showing the level-sensitive element and its mounting in its shield together with the coupling loop and detector, which are mounted in the shield;

Fig. 8 is a diagrammatical view of one form of apparatus used to operate a control switch;

Fig. 9 is a diagrammatical view of another form of apparatus used to operate a reversible alternating current motor; and Fig. 10 is a perspective view, with parts broken away, of another form of level-sensitive element.

Referring to these drawings and first to Figs. 1 to 4 thereof, the invention makes use of a level-sensitive element 1, which is suitably mounted in a container 2 of any desired kind of fluent material 3, liquid or solid. The sensitive portion 4 of this element is mounted generally parallel with and spaced above the surface 5 of the material in the container. The spaced relationship of the portion 4 and surface 5 is maintained by suitable means actuated by the signal derived, as will be later described in detail, from the sensitive element 1. Such means may, for example, consist of an electric motor 6 (Fig. 5) driving, preferably through suitable gear reduction mechanism indicated at 7, a sprocket or pinwheel 8, carrying a chain or tape 9 (Fig. 1), from one end of which the sensitive element 1 and its enclosing shield 10 are suspended. The shield is in the form of an inverted can with the end adjacent the surface of the fluent material normally open although it could, if desired, be closed by a thin membrane of insulating material. The other end of tape 9 carries a counterweight 11. The shaft 8' of sprocket 8 drives by bevel gearing 12 a vertical shaft 13, which in turn drives by bevel gearing 14 a shaft 15, which operates a suitable indicator 16, as for example one of the number wheel type, showing the level of material in the tank. The motor 6 will turn in one direction or the other to raise or lower the sensitive element 1 as may be required to maintain the predetermined spaced relationship. Alternatively, the motor 6 may, as shown in Fig. 2, drive a pump 17 which is connected by a pipe 18 with a supply of the material and by a pipe 19 with the lower part of a tank 20 in which the element 1 is stationarily mounted. The pump can force material into or draw material out of the tank to raise or lower the level 5 of the material in the tank as required to maintain the desired predetermined spacing between the surface of the material and the stationary sensitive element. The signal derived from the latter may also be made, as shown in Fig. 3 and as will later be described in detail, to start and stop a non-reversing motor 21, which operates a pump 22 to draw in material from a suitable supply through a pipe 23 and force it through a pipe 24 into a tank 25 in which the sensitive element 1 is stationarily supported. As the material in the tank is used up and its level falls, the motor 21 will operate the pump to bring the level back to the desired point. The sensitive element is maintained out of contact with the fluent material in the forms shown in Figs. 1, 2 and 3, which is very desirable when the material is dirty, corrosive or very viscous. However, the sensitive element may in some cases be submerged, as shown for example in Fig. 4, where the sensitive element is arranged to respond to the level 26 of water 27 contained in a container 28 below a body of oil 29. Here the element 1 will be immersed in the oil but its sensitive portion 4 is still maintained in a predetermined spaced relationship above the level 26 of the water to which it is tuned to respond, as will later appear. With the Fig. 4 arrangement, the motor 6 may be arranged to raise and lower the sensitive element and indicate the level of the water or the sensitive element may be fixed and the motor may operate a pump to maintain the desired level of water in either the manner of Fig. 2 or Fig. 3. In Figs. 1 and 4, the container, in which the sensitive-element is mounted, is a vertical tube, connected like a gauge glass, at top and bottom to a larger tank 30, while in Figs. 2 and 3, the element 1 is mounted directly in the tank itself.

The sensitive element itself is best shown in Fig. 7, which is a perspective view taken as if looking into the open end of a can-like shield 10, while the same is inverted from its normal working position. The sensitive element consists of a wire element which is electrically resonant at some predetermined high frequency, as for example, 200 megacycles. The wire is bent into the form shown and supported on insulators 31, each fixed at one end to a post 32 the other end of which is fixed to the head of the shield 10. These insulators have metallic inserts 33 to which the wire is soldered. The sensitive portions 4 of the resonant wire consist of two portions each having an arc and a chord-like part which together mark off an almost complete segment of a circle. All these parts lie in one horizontal plane, which is parallel with and spaced inwardly a short distance, say a sixteenth of an inch, from the plane of the open end of the shield. The arc-like parts lie in spaced concentrical relation with the peripheral wall of the shield. The chord-like parts are parallel. The junction between each chord-like and arc-like part is soldered to an insert 33 of an insulator 31. From the other end of each chord-like part the wire is bent vertically inward, as at 34, and then horizontally, as at 35, in underlying relation with the chord-like parts. The two horizontal parts 35 are joined by a coupling loop 36, the mid-point of which is connected by a wire 37 to the head of the shield 10 and thus grounded. The junction of each part 34 with a part 35 is soldered to insert 33 of an insulator 31. Within the shield 10 is a wire loop 38 in fixed coupling relation with loop 36 and the ends of this loop are connected by wires 39, which connect with the terminal ends of the wires 40 of a two-conductor, radio-frequency cable. This cable has a shield 41, which is shown later in the diagrams and which is suitably connected to shield 10. Also contained within the shield 10 is a rectifier or detector 42 which is of the crystal diode type, such as a sealed-in-glass Germanium rectifier which is desirable because it is small, requires no power supply and is suitable because of its low capacity for operation at the very high frequencies used. One terminal of this rectifier is connected by a wire 43 to the mid-point of coupling loop 38 and the other terminal is connected by a wire 44 to the resonant wire 1 at a suitable point and as shown to one of the horizontal sections 35. When a signal is impressed on the resonant wire, by means to be later described, the voltage is greatest at the free ends 45 of the wire and progressively decreases to zero at the mid point of the wire. The tap 44 is selected to transmit to the rectifier 42 the desired fraction of the signal voltage, which may for example be about $\frac{1}{10}$ of the full voltage.

Fig. 8 shows a form of the apparatus, which can be used to actuate a switch such as 46, which in turn may control a motor such as the above described pump-actuating motor 21, shown herein as supplied from a 115 volt, 60 cycle alternating current source. A high frequency signal is impressed on the resonant wire 1 by any suitable means, such as the oscillator 47, which is of well known form and the parts of which are entirely enclosed within a suitable shield, indicated by the dotted lines 48. This is a low-power oscillator having a frequency range sufficient to include the natural frequency at which wire 1 is resonant. The plate circuit coil of the oscillator consists of a piece of copper tubing 49, the semicircular end of which forms a coupling loop 50. This loop is loosely coupled by an adjustable loop 51 to the transmission wires 40, above described, and thus to loop 38 which is coupled as heretofore described, to the loop 36 of the resonant wire 1. The tank circuit of the oscillator includes a variable condenser 52 by means of which the oscillator can be tuned to resonance with the sensitive element 1. Power for the oscillator is derived from a full wave rectifier 53, supplied from the secondary 54 of a transformer 55, the primary 56 of which is connected as shown to the above mentioned alternating current source. The mid point of secondary 54 is grounded and its ends are connected one to each of the plates 57 of the rectifier. The transformer also has a secondary 58 to supply current at 5 volts to the cathode 59 of the rectifier and a secondary 60 to supply current at 6 volts to the heating filament 61 of the oscillator tube 62. The rectifier 53 supplies direct current at 200 volts to the oscillator through a connection 63, which includes a small radio frequency choke 64 and is connected to one side of a by-pass condenser 65, the other side of which is grounded. Similar small radio-frequency chokes 66 are inserted in the supply wires of filament 61 and in the ground connection of cathodes 67. The oscillator is tuned to resonance with the wire 1, while the latter is relatively remote from the surface of the fluent material in the container. In the present example, the effect of the fluent material on the resonant wire would be negligible at a distance of say six inches, there would be a slight effect at a distance of three inches and a rapidly increasing effect as the distance decreases. A minute amount of power, say for example, of the order of 1/100 of a watt, is transferred to the wire 1 when the latter is in resonance and at a small voltage, say in the neighborhood of one volt. The presence of the fluent material detunes the wire because its dielectric constant is higher than air. A portion of the signal passes through the rectifier 42, through the transmission wires 40 to coupling loop 51 and by a wire 68 to one terminal of the coil 69 of a very sensitive relay which actuates switch 46, closing it when the space between the wire 1 and surface 5 of the fluent material exceeds the predetermined spacing, which may in this example be one inch, and increases the signal sufficiently for the purpose. The wire 68 has a small radio-frequency choke 70 therein and is connected to one side of a by-pass condenser 71 the other side of which is grounded. This choke 70 and condenser 71 are both located within the shield 48 and are for the purpose of excluding the high frequency current from the wire 68. For insurance a condenser 72 is connected between the wire 68 at a point adjacent relay coil 69 and the ground for the same purpose. The wire 68 has a shield 73, which is connected to the shield 48 of the oscillator. It will be clear that, as the spacing between the sensitive portions 4 of the resonant wire 1 and the surface 5 of the fluent material increases, the amplitude of the signal in wire 1 increases until the portion of the signal derived from wire 1 and transmitted to the very sensitive relay 69 is sufficient to close switch 46 and start the motor 21. Obviously, the relay could be made to open the switch, whenever such action is desired for a particular control.

Fig. 9 shows another form of the invention which affords an exceedingly sensitive antihunting control for a reversible motor, such as the above mentioned motor 6. A high frequency signal is produced by the same oscillator 47, but the signal is modulated with 60 cycle alternating current. The coupling between the resonant wire 1 and the oscillator is the same as described in connection with Fig. 8; the same kind of detector is used and the signal derived is transmitted in the same manner through the shielded wire 68 to a suitable amplifying means 88, to be later described, which amplifies the low-frequency 60 cycle signal sufficiently to control the movement of the alternating current motor 6. As before, power for the oscillator is derived from a full-wave rectifier 75, which is supplied from the secondary 76 of a transformer 77, the primary 78 of which is connected to a 115 volt 60 cycle alternating current source. The mid point of the secondary 76 is grounded and its ends are connected one to each of the plates 79 of the rectifier. This rectifier supplies the 300 volt direct current needed for the amplifying means to be described and this voltage is reduced to the 200 volts, needed for the oscillator, by a resistor 80, included in series in the wire 81, which connects the cathode 82 of the rectifier to the plate loop 49 of the oscillator. Also, included in series in this wire 81 is the secondary 83 of a transformer 84, the primary 85 of which is connected to the above mentioned alternating current source. This secondary supplies 60 cycle current at 70 volts to effect a fifty per cent modulation of the high frequency signal produced by the oscillator. The transformer 77, as before, has other secondaries 86 and 87 to respectively supply current at five volts to the cathode of the rectifier and current at 6 volts to the heating filament of the oscillator and the heating filaments of the amplifier tubes to be described.

The rectifier 42 derives a portion of the signal from the resonant wire 1 and transmits it as before to wire 68, the high frequency components of the signal being excluded, as before, by a choke 70 and a by-pass condenser 71. The wire 68, in this case is connected to an amplifying means represented as the elements within the dotted line enclosure 88. Wire 68 is connected to one terminal of the input control resistor 88' of an amplifier tube 89. The other terminal of the resistor is grounded and a by-pass condenser 90 is connected between the input connection to the grid 91 of tube 89 and the ground. The amplifying means is of a conventional form, designed for amplification of 60 cycle current with maximum efficiency. Only the alternating current component of the detected signal is amplified. The amplifying means comprises two triode stages, using the tube 89 and a tube 92, an interstage transformer 93, a power amplifier tube 94 and an output transformer 95 and is supplied with 300 volt direct plate current from the full-wave rectifier 75. A gain of about 2000 is effected, providing across the secondary 96 of transformer 93 a 60 cycle signal of approximately 32 volts when the wire is in resonance. A transformer 97, the primary 98 of which is connected to the 115 volt 60 cycle alternating current supply, has its secondary 99 connected to a potentiometer 100, from which a 60 cycle voltage is derived and applied in series with the secondary 96 in the grid circuit of the power amplifier tube. The transformer 84, which supplies the 60 cycle alternating current modulation for the oscillator and transformer 97 which supplies adjustable 60 cycle alternating current bias for the power amplifier grid are so connected that signal across the secondary 96 is opposite in polarity to the alternating current derived from secondary 99. A steady bias of approximately 18 volts is supplied in the conventional manner by the coil 101 of a relay 106. The signal across secondary 96 may, for example, vary from a maximum of about 32 volts, when the sensitive element 1 is in resonance, to zero. The voltage derived from secondary 99 may, for example, be constant at say 20 volts. The differential voltage is amplified say 20 times in tube 94 and reduced one-half in transformer 95, appearing in the seconondary 102 as at least 120 volts, when the wire is in resonance. The secondary 102 is connected to one winding 103 of the two-phase motor 6, and has bridged across it a power factor correction condenser 115. The other winding 104 of the motor is connected to the 115 volt, 60 cycle alternating current supply through a condenser 105. When the wire 1 is in resonance, the 60 cycle current applied to winding 103 will cause the motor 6 to turn in the direction necessary to lower the wire 1. As the wire 1 is lowered toward the surface of the fluent material, the wire is detuned to various degrees and the amplitude of the signal, derived and amplified as described, will decrease and eventually the signal voltage across secondary 96 will equal the voltage derived from transformer secondary 99 and the differential voltage becomes zero, when the motor 6 will stop with the wire 1 located at say one inch above the level of the fluent material. Now, if the level rises, the voltage across secondary 96 will become less than that derived from secondary 99 and the differential voltage applied to winding 103 will be in an opposite direction, whereby the motor will reverse and lift the wire 1 until a balance is again obtained.

The motor 6 may, of course, as above described, operate to raise and lower the level of the fluent material instead of lowering and raising the wire 1.

The relay coil 101 serves two purposes. It acts as a cathode bias resistor for the power amplifier tube 94 and also actuates a switch 106 controlling two indicator circuits connected to the 115 volt alternating current source. When the apparatus is in operation, coil 101 will be energized and cause switch 106 to engage a contact 107 and close the circuit to an indicator lamp 108, which indicates that the apparatus is working properly. Deenergization of coil 101 will cause switch 106 to leave contact 107 and open the circuit to lamp 108 and to engage a contact 109 and close a circuit to a lamp 110, which indicates that the apparatus is not in operation. On failure of the power supply, burn-out of rectifier tube 75 or transformer 76, or short circuit of the filter condensers 111 or 112, or failure of the power amplifier tube, the relay 101 will extinguish the operating indicator 108 and illuminate the danger indicator 110.

The transformer 55, oscillator 47, full-wave rectifier 53 and relay 69 of the Fig. 8 apparatus or the oscillator 47, transformers 77, 84 and 97, full-wave rectifier 75, amplifying means 88, and relay 106 of the Fig. 9 apparatus may be housed, as shown in Fig. 1, in a box 111' into which lead the alternating current supply wires 112' and from which lead wires 113 to connect with motor 6. The shielded radio-frequency cable 41, indicated in Figs. 1, 5 and 6 by a single line, extends from the inverted can-like shield 10 to the housing 111' and may be mounted in any suitable way to pay out the cable as the shield and the sensitive element housed therein descend in the container and to take up the slack as such shield and element rise. An illustrative example of one mounting, suitable for the purpose, is shown in Figs. 1 and 6. The cable extends upwardly from shield 10 in the container 2 and part way around a pulley 114, fixed to the shaft 8'. From the pulley 114, the cable passes part way around the first of a series of seven sheaves 116, all loosely mounted on an arbor 117, suitably supported from a housing 118. The cable then passes downwardly around the lower part of the first of a series of seven sheaves 119, all loosely mounted on an arbor 120, which is pulled downwardly by a weight 121. The cable then passes upwardly and over the second sheave 116, then downwardly around the second sheave 119 and so forth until it finally leaves the seventh lower sheave 119 and passes horizontally across to a pulley 122 and then downwardly to the housing 111'. It will be clear that, as the sensitive element 1 and its shield 10 move downwardly, the arbor 120 will rise toward arbor 117 and provide the cable necessary and that when this element and its shield rise, the weight 121 will draw arbor 120 downwardly to take up slack in the cable.

In Fig. 10, a modified form of level-sensitive element is shown. This view is taken similarly to Fig. 7 and shows the parts inverted. Here, a resonant wire 1' has a sensitive portion 4' of nearly circular form mounted in spaced coaxial relation with the peripheral wall of shield 10' and in a plane close to and parallel with that in which the open end of the shield is located. This portion 4' is supported by soldering it to metallic inserts 33' in insulators 31' mounted on posts 32' secured to the head of shield 10'. As before, the wire 1' has a coupling loop 36', one end of which is grounded by a wire 37' to the head of the shield. A coupling loop 38', related to loop 36', is connected by wires 39' to the wires 40 of the radio frequency cable. The crystal diode detector 42 is connected by wires 43' and 44' to the mid point of coupling loop 38' and to the resonant wire 1' at a point suitably spaced from the ground connection. This arrangement is a "quarter wave" resonant wire instead of the half wave resonant wire shown in Fig. 7. It uses only half the wire needed with the Fig. 7 form and eliminates the half that did not have the tapped connection to the rectifier. This resonant wire is easier to tune because it does not have two sections as does the half wave resonant wire of Fig. 7, which sections must be exactly matched in order to be tuned to resonance.

The invention provides an extremely sensitive control which responds to slight variations in the level of the material in a container and will determine the level with very close accuracy. Since the sensitive element follows the fluent material up and down in spaced relation with the surface of the fluent material, the control may be used with materials which would destroy the sensitive element on contact, such as acids or molten material. And close accuracy can be had in the measurement of liquids, which are very viscous or which by their nature would impair the movement of a level-sensitive element, requiring contact with the fluent material. It is useful for level determination in large tanks, where waves may be produced in the fluent material that would affect the movement of a level-sensitive element in contact with the fluent material. Because of the extremely low voltage of the signal impressed on the resonant wire, the control can be safely used in containers of inflammable liquids. The control is also useful with such solid materials as will flow. The control as used for level determination with the reversible motor for moving the sensitive element, provides for movement of the element with any very slight change in level of the material and not in steps but with the fluent material. The sensitive element follows the fluent material, as it moves up and down, and is virtually synchronized with it. The motor does not go on and off periodically. Rather its torque gradually increases from zero, when the level of the fluent material is stationary, in one direction or the other accordingly as the level of the fluent material rises or falls and immediately follows the level. Thus, close accuracy in measurement may be had. One of the conditions the control had to fulfill was to show the level in a deep tank with a variation of no more than one eighth of an inch in fifty feet, or approximately .02%.

As used for maintaining the level in a container constant, the invention is useful, as before, with inflammable liquids or fluent material, which would destroy the sensitive element if brought in contact with it. The control is sensitive to slight variations in level and can provide closer regulation of the level in a tank since the sensitive element does not have to be moved by the fluent material and remains out of contact with it.

The sensitive element may be tuned to respond to the level of one of a plurality of liquids in a tank, providing the liquids have different electrical properties. Thus, in the case of the apparatus shown in Fig. 4, oil is an insulator while water is a conductor electricity. Therefore, the water will detune the resonant wire. Thus, the sensitive element can be made to respond to variations in the level of the water, unaffected by the presence of the oil above it.

The invention thus provides a level-sensitive apparatus for the control of the level of fluent material in a container, or for the determination of such level, and this control is characterized by the use of a resonant wire, on which a high frequency signal is impressed and which is tuned to resonance while substantially spaced from the fluent material in a container and therefore, becomes detuned, when in close proximity to the surface of the material, the detuning providing a change in the amplitude of the signal which change is utilized to actuate a suitable control to move the level of the fluent material or to move the sensitive element toward or away from the fluent material, as required.

What is claimed is:

1. The combination with a container of fluent material, of a wire element electrically resonant at a predetermined frequency and mounted in said container spaced above the surface of said material a predetermined distance, means for effecting relative movement between said element and surface, said means including a two-phase low-frequency electric motor having two windings, separate circuits for supplying low-frequency alternating current in proper phase relation to the windings of said motor, a high-frequency low-power oscillator inductively coupled to said element and tuned to resonance therewith when the element is relatively remote from the surface of said material and detuned to various degrees as the element approaches said surface, means for modulating the high frequency oscillations with alternating current of the low frequency used for said motor, a rectifier receiving part of the signal from the resonant element, and means for amplifying the rectified signal and transmitting it to one of said circuits in a direction to oppose the first-named alternating current supply thereto, the full amplified signal when said oscillator and element are in resonance being greater than the first-named alternating current supply to the last-named circuit and causing the motor to effect relative movement in the first-named direction until the amplified signal and first-named alternating current balance, when said element is spaced from said surface by said predetermined distance, further relative movement in the first-named direction decreasing the amplified signal to less than the first-named alternating current supply and causing the motor to effect relative movement in the opposite direction until said element and surface are separated by said predetermined distance.

2. The combination with a container of fluent material, of a wire element electrically resonant at a predetermined frequency and located in said container spaced above the surface of said material a predetermined distance, means for moving said element up and down in the container to follow variations in the level of said material, said means including a two-phase low-frequency electric motor having two windings, separate circuits for supplying low-frequency alternating current in proper phase relation to the windings of said motor, a high-frequency low-power oscillator inductively coupled to said element and tuned to resonance therewith when the element is relatively remote from the surface of said material and detuned to various degrees as the element approaches said surface, means for modulating the high frequency oscillations with alternating current of the low frequency used for said motor, a rectifier receiving part of the signal from the resonant element, and means for amplifying said part of the signal and transmitting it to one of said circuits in a direction to oppose the first-named alternating current supply thereto, the full amplified signal when said oscillator and element are in resonance being greater than the first-named alternating current supply to the last-named circuit and causing the motor to lower said element until the amplified signal and first-named alternating current balance, when said element is spaced from said surface by said predetermined distance, further lowering of said element decreasing the amplified signal to less than the first-named alternating current supply and causing the motor to raise said element until it is spaced from said surface by said predetermined distance.

3. The combination with a container of fluent material, of a wire element electrically resonant at a predetermined frequency and having sensitive end portions and intermediate such end portions a coupling loop, a member supporting said element in said container with the sensitive end portions spaced a predetermined distance above the surface of the fluent material, means for effecting relative movement between said supporting member and surface to maintain the predetermined spacing of said end portions and surface, a high-frequency oscillator with a coupling loop, a radio-frequency cable having a coupling loop on one end related to the oscillator loop and a coupling loop on the other end mounted on said supporting member and related to the first-named loop, whereby a high frequency signal from the oscillator may be impressed on said element, said element being tuned to resonance with said oscillator when said portions and surface are in another and wider predetermined spaced relationship, the relative movement of said portions and surface toward said first-named predetermined spacing detuning said element and decreasing the amplitude of said signal, a detector of the crystal diode type connected to said element at a point spaced from the mid point thereof and connected to the coupling loop of said cable on said supporting member, and a conductor connecting the other loop on said cable to said first-named means and transmitting the detected signal to the first-named means for actuating the same.

4. The combination with a container of fluent material, of a wire element in said container electrically resonant at a predetermined frequency and spaced above the surface of said material a predetermined distance, said element with some of said material and the gap between the element and material forming a first circuit, a high-frequency low-power oscillator, a second circuit including said oscillator and coupled to the first circuit for producing in the latter a high-frequency low-voltage signal, means for effecting relative movement between said element and surface, the first circuit being tuned to resonance with the second circuit when said element and surface are in another and wider predetermined spaced relationship, the relative movement of said element and surface toward the first-named predetermined spacing detuning the first circuit and decreasing the amplitude of the signal, a detector, an electrical operator, and a third circuit including said detector and operator and coupled to the first circuit through said detector to receive a portion of the signal therefrom and transmit it to the operator, whereby the latter may be actuated by a variation in the amplitude of the detected signal.

5. The combination with a container of fluent material, of a wire element in said container electrically resonant at a predetermined frequency and spaced above the surface of said material a predetermined distance, said element with some of said material and the gap between the element and material forming a first circuit, a high-frequency low-power oscillator, a second circuit including said oscillator and coupled to the first circuit for producing in the latter a high-frequency low-voltage signal, means for effecting relative movement between said element and surface, means for tuning said oscillator and its circuit to resonance with said element and its circuit when said element is relatively remote from the surface of said material, the relative movement of said element and surface toward the first-named predetermined spacing detuning the first circuit and decreasing the amplitude of the signal, a rectifier connected to said element, and a third circuit including said rectifier and first-named means and coupled through said rectifier to the first circuit to receive a portion of the signal therefrom and transmit it to the first-named means, whereby the latter may be actuated by a variation in the amplitude of the detected signal.

6. The combination with a container of fluent material, of a wire element in said container electrically resonant at a predetermined frequency and spaced above the surface of said material a predetermined distance, said element with some of said material and the gap between the element and material forming a first circuit, a modulated high-frequency low-power oscillator, a second circuit including said oscillator and coupled to the first circuit for producing in the latter a high-frequency low-voltage signal, means for effecting relative movement between said element and surface to maintain the predetermined spacing, the first circuit being tuned to resonance with the second circuit when said element and surface are in another and wider predetermined spaced relationship, the relative movement of said element and surface toward the first-named predetermined spacing detuning the first circuit and decreasing the amplitude of the signal, a detector, a third circuit including said detector and coupled to the first circuit through said detector to receive a portion of the signal therefrom, and means for amplifying the detected signal and transmitting it to the first-named means to control the actuation of the same.

7. The combination with a container of fluent material, of a wire element in said container electrically resonant at a predetermined frequency and spaced above the surface of said material a predetermined distance, said element with some of said material and the gap between the element and material forming a first circuit, a modulated high-frequency low-power oscillator, a second circuit including said oscillator and coupled to the first circuit for producing in the latter a high-frequency low-voltage signal, means for raising and lowering said element to maintain the predetermined spacing, the first circuit being tuned to resonance with the second circuit when said element is raised above said surface in another and wider predetermined spaced relationship, the lowering of said element toward the first-named predetermined spacing detuning the first circuit and decreasing the amplitude of the signal, a detector, a third circuit including said detector and coupled to the first circuit whereby to receive a portion of the signal from the first circuit, and means for amplifying the signal received by the third circuit and transmitting it to said first-named means to control the actuation of the same.

8. The combination with a container of fluent material, of a wire element electrically resonant at a predetermined frequency, said element mounted in fixed position in said container and spaced a predetermined distance above the surface of said material, means for raising and lowering the level of said material in the container to maintain the predetermined spacing, said element with some of said material and the gap between the element and material forming a first circuit, a modulated high-frequency low-power oscillator, a second circuit including said oscillator and coupled to the first circuit for producing in the latter a high-frequency low-voltage signal, the first circuit being tuned to resonance with the second circuit when said element and surface are in another and wider predetermined spaced relationship, the relative movement of said element and surface toward the first-named predetermined spacing detuning the first circuit and decreasing the amplitude of the signal, a detector, a third circuit including said detector and coupled to the first circuit through the detector to receive a portion of the signal therefrom, and means for amplifying the detected signal and transmitting it to the first-named means to control the actuation of the same.

9. The combination with a container of fluent material, of a wire element in said container electrically resonant at a predetermined frequency and spaced above the surface of said material a predetermined distance, said element with some of said material and the gap between the element and material forming a first circuit, a high-frequency low-power oscillator, a second circuit including said oscillator and coupled to the first circuit for producing in the latter a high-frequency low-voltage signal, means for effecting relative movement between said element and surface, means for tuning said oscillator and its circuit to resonance with said element and its circuit when said element is relatively remote from the surface of said material, the relative movement of said element and surface toward the first-named predetermined spacing detuning the first circuit and decreasing the amplitude of the signal, a detector of the crystal diode type connected to said element, and a third circuit including said detector and coupled by the latter to the first circuit to receive a portion of the signal therefrom and transmit it to the first-named means, whereby the latter may be actuated by a variation in the amplitude of the detected signal.

10. The combination with a container of fluent material, of a wire element in said container electrically resonant at a predetermined frequency and spaced above the surface of said material a predetermined distance, a metallic shielding casing in which said element is supported and which encompasses said element except on the under side which faces said surface, said element with some of said material and the gap between the element and material forming a first circuit, a high-frequency low-power oscillator, a second circuit including said oscillator and coupled to the first circuit for producing in the latter a high-frequency low-voltage signal, means for effecting relative movement between said element and surface, means for tuning said oscillator and its circuit to resonance with said element and its circuit when said element is relatively remote from the surface of said material, the relative movement of said element and surface toward the first-named predetermined spacing detuning the first circuit and decreasing the amplitude of the signal, a detector of the crystal diode type connected to said element, and a third circuit including said detector and coupled by the latter to the first circuit to receive a portion of the signal therefrom and transmit it to the first-named means, whereby the latter may be actuated by a variation in the amplitude of the detected signal.

11. The combination with a container of two immiscible liquids located one above the other, the upper and lower liquids being respectively electrically insulating and electrically conducting, of a wire element electrically resonant at a predetermined frequency, said element being immersed in the insulating liquid and spaced a predetermined distance above the surface of the conducting liquid, said element with some of the conducting liquid and the gap between the latter and said element forming a first circuit, a high-frequency low-power oscillator, a second circuit including said oscillator and coupled to the first circuit for producing in the latter a high-frequency low-voltage signal, means for effecting relative movement between said element and surface, means for tuning said oscillator and its circuit to resonance with said element and its circuit when said element is relatively remote from the surface of said material, the relative movement of said element and surface toward the first-named predetermined spacing detuning the first circuit and decreasing the amplitude of the signal, a rectifier connected to said element, and a third circuit including said rectifier and first-named means and coupled through said rectifier to the first circuit to receive a portion of the signal therefrom and transmit it to the first-named means, whereby the latter may be actuated by a variation in the amplitude of the detected signal.

12. The combination with a container of two immiscible fluent materials located one above the other and having different dielectric constants, of a wire element electrically resonant at a predetermined frequency, said element being immersed in the upper material and spaced a predetermined distance above the surface of the lower material, said element with some of the lower material and the gap between the latter and said element forming a first circuit, a high-frequency low-power oscillator, a second circuit including said oscillator and coupled to the first circuit for producing in the latter a high-frequency low-voltage signal, means for effecting relative movement between said element and surface, means for tuning said oscillator and its circuit to resonance with said element and its circuit when said element is relatively remote from the surface of said material, the relative movement of said element and surface toward the first-named predetermined spacing detuning the first circuit and decreasing the amplitude of the signal, a rectifier connected to said element, and a third circuit including said rectifier and first-named means and coupled through said rectifier to the first circuit to receive a portion of the signal therefrom and transmit it to the first-named means, whereby the latter may be actuated by a variation in the amplitude of the detected signal.

13. The combination with a container of fluent material, of a wire element of the quarter-wave type electrically resonant at a predetermined frequency, said element having a grounded end and a free end together with a coupling loop adjacent the grounded end, a member supporting said element in said container with a portion of it between said loop and free end spaced a predetermined distance above the surface of the fluent material, means for effecting relative movement between said supporting member and surface to maintain the predetermined spacing of said element and surface, a high-frequency oscillator with a coupling loop, a radio-frequency cable having a coupling loop on one end related to the oscillator loop and a coupling loop on the other end mounted on said supporting member and related to the first-named loop, whereby a high-frequency signal from the oscillator may be impressed on said element, the latter being tuned to resonance with said oscillator when said portion and surface are in another and wider predetermined spaced relationship, the relative movement of said portion and surface toward said first-named predetermined spacing detuning said element and decreasing the amplitude of said signal, a detector of the crystal diode type connected to said wire at a point spaced from the mid point thereof and connected to the coupling loop of said cable on said support, and a conductor connecting the other loop on said cable to said first-named means and transmitting the detected signal to the first-named means for actuating the same.

HARRY F. TAPP.
THEODORE J. MESH.

REFERENCES CITED

The following references are of record in the file of this patent:

UNITED STATES PATENTS

| Number | Name | Date |
|---|---|---|
| 2,260,122 | Moore | Oct. 21, 1941 |
| 2,354,945 | Cohen et al. | Aug. 1, 1944 |
| 2,394,220 | Wagner | Feb. 5, 1946 |
| 2,433,599 | Cohen | Dec. 30, 1947 |

FOREIGN PATENTS

| Number | Country | Date |
|---|---|---|
| 750,075 | France | Aug. 3, 1933 |